United States Patent [19]

Schäfer

[11] 4,226,306
[45] Oct. 7, 1980

[54] APPARATUS FOR ACTUATING A BRAKING UNIT

[75] Inventor: Arnold Schäfer, Kloten, Switzerland

[73] Assignee: Schweizerische Lokomotiv-und Maschinenfabrik, Winterthur, Switzerland

[21] Appl. No.: 3,902

[22] Filed: Jan. 16, 1979

[30] Foreign Application Priority Data

Jan. 24, 1978 [CH] Switzerland ............... 724/78

[51] Int. Cl.³ ............................................. F16D 65/30
[52] U.S. Cl. ..................................... 188/170; 303/15
[58] Field of Search ................. 188/170; 303/9–11, 303/15

[56] References Cited

U.S. PATENT DOCUMENTS

| 2,270,431 | 1/1942 | Freeman | 188/170 |
| 2,330,739 | 9/1943 | Piron | 188/170 |
| 3,272,566 | 9/1966 | Clack | 188/170 X |
| 3,777,857 | 12/1973 | Hughes | 188/170 |
| 3,999,075 | 12/1976 | Johnson et al. | 188/170 X |

Primary Examiner—Duane A. Reger
Attorney, Agent, or Firm—Kenyon & Kenyon

[57] ABSTRACT

The braking control means (33,33a) which serve to set the brakes are connected in parallel and the shut-off and lifting control means (33', 34) which permit lifting of the brakes are connected in series with the braking units (9). A single intact braking control means (33,33a) ensures braking, while all shut-off and lifting control means (33',34) must be connected correctly for lifting the brakes. The control means (33,33a,34) are provided with positioning means (41) which can be actuated via two control lines (42a, 43a) each and a switch (48) which can be switched between an "on" position lifting the brake and an "off" position which causes the brake to be set and in which at the same time a short-circuit-like connection between the two control lines (42a, 43a) is established in order to prevent any energy supply to the positioning means (41) and, thereby, unintended lifting of the set brakes.

13 Claims, 1 Drawing Figure

U.S. Patent
Oct. 7, 1980
4,226,306
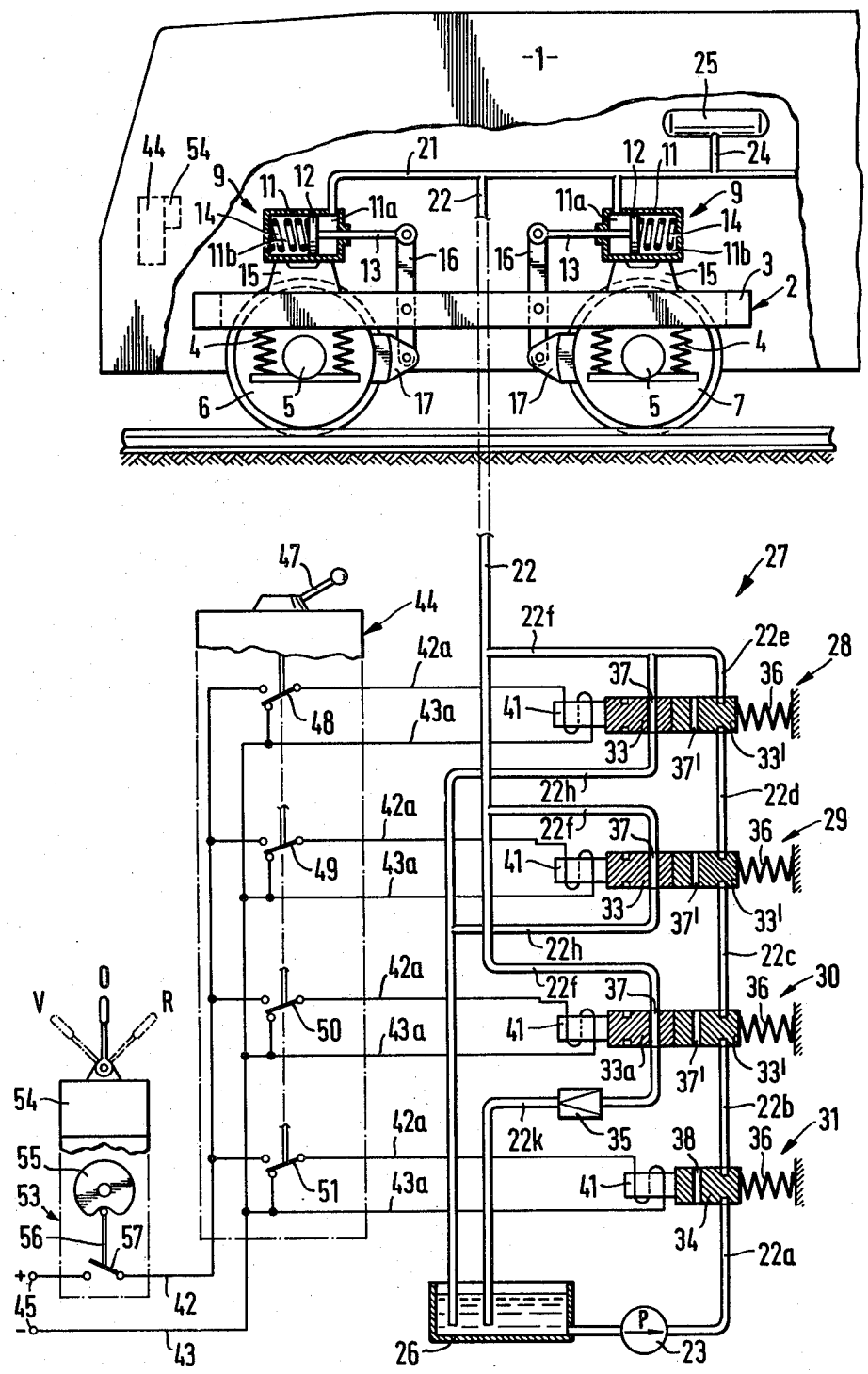

APPARATUS FOR ACTUATING A BRAKING UNIT

This invention relates to an apparatus for actuating a braking unit. More particularly, this invention relates to an apparatus for actuating a braking unit for a vehicle such as a railroad vehicle.

As is known, various types of systems have been used for actuating the brakes of a rail vehicle. In one known system, for example for actuating at least one braking unit, use has been made of at least two braking control units, each of which is coupled to a shut-off unit and at least one lifting control unit. These control units are connected via an actuating line to the braking unit and can each be switched via a positioning device between an operating position and a locked position. When in the operating position, the braking control units are in a braking position to initiate the actuation of the braking unit in the direction of braking. In the case of the shut-off unit and the lifting control unit, the operating position corresponds to a lifting position permitting the lifting of the braking unit.

Generally, an apparatus of this type is used in connection with spring accumulator brakes which cooperate with switching devices which respond when a holding current which flows during operation is interrupted. This also ensures the actuation of the braking unit if the power or the pressure medium fails and/or in the event of defects in the control or braking circuit, so that the vehicle can be stopped safely in such cases.

In case of other defects, which may be caused, for instance, by the jamming of pistons or by electrical malfunctions, faulty insulation, incorrect current paths or the like in the control circuit and which do not always cause a failure of the power or the pressure medium, there is a danger with the known apparatus, especially in an emergency, that the braking unit in question may not respond to the operating actuation.

Accordingly, it is an object of the invention to provide a brake actuating apparatus which ensures safe actuation of a braking unit if individual elements or an entire control system branch fail.

It is another object of the invention to provide a relatively simple interconnection between the components of an apparatus for actuating a braking unit to reduce the possibility that the apparatus will fail to operate in an emergency.

It is another object of the invention to provide an actuating apparatus for a braking unit of a rail vehicle which prevents unintended lifting of a once-set brake.

It is another object of the invention to provide an actuating apparatus for a braking unit of a rail vehicle which is capable of a fast response.

Briefly, the invention provides an apparatus for actuating at least one braking unit, for example of a railway vehicle. The apparatus comprises at least two braking control means for effecting a braking action in the braking unit, at least two shut-off means for preventing the braking action in the braking unit with each shut-off means coupled to a respective braking control means, at least one lifting control means for re-setting the braking unit, and positioning means for switching each of the braking control means and lifting control means between an operating position and a shut-off position. In accordance with the invention, actuating lines connect the braking control means in parallel to the braking unit while connecting the lifting control means and shut-off means in series to the braking unit. The operating position of the braking control means corresponds to an actuation of the braking unit into a braking condition while the shut-off position of the braking control means corresponds to a blocking of the braking of the braking unit. The operating position of the shut-off means and the lifting control means corresponds to a release position permitting re-setting of the braking unit while the shut-off position corresponds to the operating position of the braking control means, i.e. braking by the braking unit.

The switching arrangement allows the braking unit to be actuated even if several control means fail if only a single control means suitable for executing a braking maneuver is intact or only a single one of the parallel-connected braking control means is switched correctly. On the other hand, the series connection of the lifting control means and the shut-off means prevents unintended lifting of the once-set brake, since all control and shut-off means must be brought into the switch position which is functionally provided therefore and, in general, is centrally monitored for the lifting process.

Where the apparatus employs a pressure medium as an activating medium for the control means, an advantageously rapid response of the braking unit to a corresponding braking signal can be accomplished practically without delay, if each of the braking control means has a relatively large flow cross section sized for a fast discharge of the full quantity of pressure medium which is to be displaced from the braking unit.

According to a particularly simple and operationally safe embodiment, the braking and lifting control means can be connected to a switching device which comprises a separate switch which can be actuated individually for each of the positioning means.

The apparatus may also be constructed with two control lines for each of the positioning means, which can be connected to different energy potentials. In this case, the operational reliability can be improved substantially in a simple manner if at least one of the switches associated with the positioning means of the braking control means comprises a switching element or cooperates with such, which establishes a short-circuit-like connection between the two control lines in the operating position of the switch which is intended for initiating the braking process. In this manner, the energy supply to the associated positioning means is simultaneously prevented automatically during each actuation of the respective switch for executing a braking maneuver. Similarly, the locking of the braking control means in the braking position, and therewith the set brake, cannot be released unintentionally in any case, for instance, in the event of a possible short due to faulty insulation.

In order to prevent operating disturbances in a control system that is to be actuated only rarely, for instance, in the case of emergency braking, it is advantageous to connect at least one of the switches associated with the braking control means in series with at least one other switch which can be actuated via a positioning device independently of the operational switching device of the respective braking control means, especially if the vehicle is standing still. In this manner, the braking control means is actuated outside the operating phase provided therefore, for instance, at least once when shutting off or switching the drive motors. As a result, gumming of the control means is particularly prevented without having to tolerate operational disadvantages thereby.

In an apparatus with more than two braking control means associated with the same braking unit, the response time of the braking unit can be shortened advantageously and the operational readiness improved if, at least one of the additional braking control means is connected to a line for discharging the pressure medium which contains a pressure limiting valve which can be set to a predetermined maximum value. This arrangement makes possible an increase of the braking readiness, in that the moving part, for instance, a piston of the braking unit, quickly traverses the travel distance ineffective for the braking which is predetermined by the setting of the pressure limiting valve and is required for a brake shoe to approach the other part of the brake, until the brake shoe is applied to the other part of the brake practically without braking effect. At that time, the braking process proper can be initiated via one of the other braking control means practically without delay.

These and other objects and advantages of the invention will become more apparent from the following detailed description and appended claims taken in conjunction with the accompanying drawings in which:

The drawing illustrates a schematic view of a railway vehicle having a braking unit and an actuating apparatus according to the invention.

As shown in the drawings, the railroad vehicle has a vehicle body 1 shown in part, which is supported via springs (not shown) on two trucks 2, of which only one is visible. Each truck 2 is connected via a device (not shown for the sake of simplicity) for transmitting traction and braking forces, for instance, via a kingpin arranged in the center of the truck or a low-slung pulling device, to the vehicle body 1 and which is movable essentially about a vertical axis. Each truck 2 contains a frame 3 which is supported on lateral bearings 5 of two sets of wheels 6, 7 via springs 4 in a manner known per se. The wheel sets are equipped with a drive motor (not shown).

A braking unit 9 is associated with each wheel of the two sets of wheels 6, 7. Each braking unit 9 is operable between a released condition and a braking condition (as shown) and comprises a hydraulic cylinder 11 with a piston 12 which separates two cylinder chambers 11a, 11b and is provided with a piston rod 13. Each piston 12 is loaded by a pretensioned compression spring 14 which is arranged in the cylinder chamber 11b. The cylinders 11 are fastened to brackets 15 of the truck frame 3. The piston rods 13 are linked to respective two-arm levers 16 which are fulcrumed at the truck frame 3. Brake shoes 17 are linked to the levers 16 and can be pressed, under the action of the compression springs 14, against a braking surface provided at the respective vehicle wheel 6,7.

The cylinder chambers 11a are connected to a connecting line 21 which in the embodiment shown is connected to a corresponding pair of cylinders (not shown) which is arranged at the second truck.

An actuating means 27 is mounted on the vehicle 1 for moving each braking unit 9 between the braking condition and released condition. This actuating means includes a pressure medium source, such as an oil tank 26, an actuating line 22 connecting the tank 26 via a connecting line 21 to the braking unit 9, a pump 23 in the line 22 with a suction side connected to the tank 26 for pumping the pressure medium from the tank 26 and a plurality of control systems 28, 29, 30, 31 for controlling a flow of pressure medium in the line 22.

As shown, the connecting line 21 is connected by a line 24 to a pressure accumulator 25.

For reasons of visibility, the oil tank 26 and the actuating means 27 associated with the braking units 9 are shown outside the area of the vehicle 1.

The four control systems 28, 29, 30, 31 can be influenced spearately and comprise three braking control means 33, 33a and one lifting control means 34, which can be switched between an operating position and a shut-off position. Each braking control means 33 and 33a is coupled to a correspondingly switchable shut-off means 33' in such a manner that the shut-off position of a shut-off means 33' corresponds to the operating position of the braking control means 33 and 33a, respectively, and vice versa.

The lifting control means 34 is connected to a section 22a of the actuating line 22 connected to the pressure side of the pump 23 and is connected in series via further, consecutive sections 22b, 22c, 22d and 22e to the shut-off means 33' of the control systems 28, 29, 30 and the braking cylinders 11. The section 22e is connected to one of three branch lines 22f of the actuating line 22. The braking control means 33, 33a are connected in parallel, each being arranged between one of the branch lines 22f and a discharge line 22h or 22k leading to the oil tank 26. The discharge line 22k contains an adjustable pressure limiting valve (overpressure valve) 35.

The braking control means 33, 33a, l each form a structural unit with a shut-off means 33', and are constructed, as is the lifting control means 34, as a valve which can be operated electromagnetically. The valve in the control system 28 serves, e.g. as an emergency braking valve, while the valve in the control system 29 serves as an operational braking valve, and the valve in the control system 30 serves as a brake applying valve. The valve in the control system 31 serves as a lifting valve which is to be actuated only for resetting the braking units 9. The braking control and shut-off means 33, 33a and 33', respectively, and the lifting control means 34, the construction of which, being known per se, are shown in simplified manner as control pistons each of which are loaded by compression springs 36 and have a single passage 37, 37' and 38, respectively.

In the operating position of the actuating means 27 shown, the passages 37' and 38 of the shut-off means 33' and of the lifting control means 34 are outside the connecting region of the line sections 22a, 22b, . . . 22e, so that the oil supply to the braking units 9 is shut off. The passages 37 of the braking means 33, 33a however connect the branch lines 22f and 22h or 22k, respectively, so that oil can escape from the cylinder chambers 11a into the oil tank 26 and the brake shoes 17 make contact with the brake surfaces of the wheels 6, 7 under the action of the spring-loaded pistons 12. The braking units 9 are thus in a braking condition.

In the second operating position (not shown) of each control means 33, 33a, 33' and 34, the respective passages 37', 38 connect the line sections adjoining them, 22a, 22b, . . . 22e so that the oil supply can pass through for lifting the brakes, while the corresponding passage 37 of the braking control means 33 and 33a lies outside the connecting region of the branch lines 22f and 22h or 22k, respectively, so that the oil discharge from the cylinders 11a initiating the setting of the brakes is blocked. The braking units 9 are thus in a released condition.

The braking control and shut-off means 33, 33a and 33' as well as the lifting control means 34 are each provided with an electromagnetic positioning means 41. Each positioning means 41 can be actuated via parallel-connected control lines 42a, 43a, which can be connected to different energy potentials, e.g. a current source 45 via a switching device 44 and two connecting lines 42, 43. The switching device 44 is in reality provided twice, once in each control cabin of the vehicle, and has a separate switch 48, 49, 50 and 51 for each of the control systems 28, 29, 30 and 31. Each switch 48–51 can be positioned in a manner known per se, for instance, by operating a lever 47 or by a corresponding signal released, for instance, from the passenger compartment via a connection (not shown) each individually selectably between the "off" position shown and an "on" position, in which the respective control line 42a is connected to the connecting line 42.

The connecting lines 42, 43 are brought via a further switching device 53, which in reality is likewise provided twice and which is coupled to a positioning device 54 which can be actuated independently of the operational switching device 44. In the example shown, this is the travel direction switch which is provided in the two control cabins and can be switched between a zero position O and positions V and R for forward and reverse travel, respectively. In the simplified presentation, the switching device 53 has a cam 55 which cooperates via a positioning member 56 with a switch 57 associated with the connecting line 42.

In the operating position of the actuating means 27 and the switching devices 44 and 53 shown, the positioning means 41 carry no current. Accordingly, the supply of pressure medium to the cylinders 11a is blocked and the braking units 9 are set.

The brakes can be lifted only if the travel direction switch of the positioning device 54 occupies the position V or R, so that the switch 57 moves from the "off" position shown into the "on" position, in which the switch 57 connects the connecting line 42 to the current source 45. For lifting the brakes, all switches 48 to 51 of the switching device 44 are switches from the "off" position shown into the "on" position, in which the positioning means 41 are energized. Accordingly, the control means 33, 33a, 33' and 34 are moved from the operating position shown into the second operating position, in which they release the pressure medium supply into the cylinders 11a for lifting the brake shoes 17. Connecting the lifting control means 34 in series with the shutting-off means 33' ensures that the brakes are lifted only if the lifting control means 34 and all shutting-off means 33' occupy the pass or operating position required for the lifting process.

In order to perform a braking operation, it is in principle sufficient if only one of the braking control means 33 is switched into the pass or operating position shown, since the discharge of the cylinders 11 required to actuate the brake is ensured by connecting the braking control means 33, and 33a in parallel.

In the embodiment shown, the switch 50 of the control system 30 is initially switched to the "off" position shown to initiate a braking maneuver. As a result, the circuit for the positioning means 41 of the braking control/shut-off means 33a, 33' serving as a brake-applying valve is interrupted and brought, by the compression spring 36, into the rest position shown. In this position, the oil supply is shut off and the pressure oil can flow into the oil tank 26 via the discharge line 22k. By an appropriate setting of the pressure limiting valve 35, a predetermined maximum pressure can be maintained in the cylinder chambers 11a. Thus, the stroke of each spring-loaded piston 12 can be adapted to the dead travel distance to be traversed by the brake shoes 17 so that the shoes 17 are applied to the brake surfaces of the wheels 6, 7 practically without a braking action. In this manner, the braking units 9 are prepared for executing the operational braking maneuver proper, in which the braking units 9 respond practically without delay and the brake shoes 17 are pressed against the brake surfaces of the wheels 6, 7 within fractions of a second.

In the "off" position shown, the switches 48, 49, 50 and 51, establish a short-circuit connection between the control lines 42a, 43a of the respective positioning devices 41. This prevents any unintentional energy supply caused, for instance, by an incorrect connection, to the respective, operationally disconnected positioning device 41. As a result, the respective control means 33, 33a or 34, can be unlocked only through cancellation of this short circuit connection.

The connecting line 42 is separated from the current source 45 each time the drive device of the vehicle is shut off or switched by the switching device 53. This ensures that upon every operation of the reversing switch, all control means 33, 33a and 34 are moved from a possibly retained operating position (outside the operating phases provided for their operational actuation) into the rest position shown. Similarly, gumming of the control means 33, 33a and 34, especially of the one of the control system 28 which is to be activated only relatively rarely, i.e., in the case of emergency, can be prevented.

Various other embodiments are possible. Thus, it may be advantageous to connect only one of the control systems 28 to 31 for instance, the emergency-brake control system 28, to the switching device 53 and to connect the other control systems directly to the current source 45.

It goes without saying that the arrangement according to the invention is also suitable for other vehicles with mutually independently operable braking devices. In addition, a pneumatic or electric actuating device can be used instead of the hydraulic one, and a hydraulic or pneumatic switching device can be used instead of the electric one.

What is claimed is:

1. Apparatus for actuating at least one braking unit; said apparatus comprising
   at least two braking control means for effecting a braking action in the braking unit;
   at least two shut-off means for preventing a braking action in the braking unit, each shut-off means being coupled to a respective braking control means;
   at least one lifting control means for re-setting the braking unit;
   actuating lines connecting said braking control means in parallel to the braking unit and connecting said lifting control means and said shut-off means in series to the braking unit; and
   positioning means for switching each of said braking control means and said lifting control means between a respective operating position and shut-off position; said operating position of each said braking control means corresponding to an actuation of the braking unit into a braking condition and said shut-off position of each said braking control means corresponding to a blocking of the braking of the braking unit, said operating position of each said shut-off means and said lifting control means corresponding to a release position permitting re-setting of the braking unit and said shut-off position of said shut-off means and said lifting control means corresponding to said operating position of each said braking control means.

2. An apparatus as set forth in claim 1 wherein said actuating lines convey a pressure medium and wherein said braking control means each have a relatively large flow cross-section for rapid discharge of the quantity of pressure medium to be displaced from the braking unit.

3. An apparatus as set forth in claim 1 which further comprises a switching device having a plurality of separably-operated switches, each said switch being connected to a respective one of said positioning means for a respective braking control means and lifting control means.

4. An apparatus as set forth in claim 3 which further comprises two control lines connected to each respective positioning means and to different energy potentials, at least one of said switches of said braking control means having a switching element for establishing a short-circuit-like connection between said control lines to a respective positioning means in said operating position of said braking control means.

5. An apparatus as set forth in claim 3 which further comprises a positioning device having a switch connected in series with at least one of said switches connected to said braking control means, said positioning device being actuable independently of said positioning means to a respective braking control means.

6. An apparatus as set forth in claim 2 wherein said braking control means number at least three and wherein a discharge line is connected to one of said braking control means for discharging pressure medium therefrom and a pressure limiting valve is disposed in said line to limit the pressure of discharged medium to a predetermined maximum valve.

7. In combination,
at least one braking unit for a vehicle, said unit being operable between a released condition and a braking condition;
an actuating means for moving said braking unit between said conditions, said actuating means comprising a pressure medium source, an actuating line connecting said source to said braking unit to convey a flow of pressure medium thereto for moving said braking unit from said braking condition to said released condition and a plurality of control systems for controlling a flow of pressure medium in said line,
at least two of said control systems being connected in parallel between said source and said braking unit and including a valve having a braking control means movable between a shut-off position blocking a flow of pressure medium from said braking unit and an operating position permitting the flow of pressure medium to pass from said braking unit and a shut-off means coupled to said braking control means to move therewith between a shut-off position blocking a flow of pressure medium to said braking unit and an operating position to permit a flow of pressure medium to said braking unit;
at least one other of said control systems being connected in series with said shut-off means of each said two control systems, said one control system including a lifting valve movable between a shut-off position blocking a flow of pressure medium to said braking unit and an operating position to permit a flow of pressure medium to said braking unit; and
each said control system having a positioning means for switching a respective valve between a respective shut-off position and operating position.

8. The combination as set forth in claim 7 which further comprises an operational switching device having a plurality of separably-operable switches, each said switch being connected to a respective one of said positioning means for actuating said positioning means to cause movement of a respective valve from said shut-off position into said operating position thereof.

9. The combination as set forth in claim 8 which further comprises a positioning device having a switch connected in series with at least one of said switches of said switching device connected to said two control systems, said positioning device being actuable independently of said switching device to move from a zero position to an actuating position indicating one of a forward and reverse position.

10. The combination as set forth in claim 7 wherein said actuating means further comprises a discharge line connecting a respective one of each of said two control systems to said pressure medium source for discharging pressure medium from said actuating means to said source in said operating position of said braking control means.

11. The combination as set forth in claim 10 wherein at least three of said control systems are connected in parallel and have a valve with a braking control means and shut-off means, and which further comprises a pressure limiting valve disposed in a discharge line of one of said control means to limit the pressure of discharged medium to a predetermined maximum valve.

12. The combination as set forth in claim 7 wherein each of said control systems includes a spring biasing a respective braking control means to said operating position thereof and said shut-off means and lifting valve to said shut-off positions thereof.

13. The combination as set forth in claim 7 wherein said braking control means and shut-off means of each of said two control means form a single structural unit.

* * * * *

UNITED STATES PATENT AND TRADEMARK OFFICE
CERTIFICATE OF CORRECTION

PATENT NO. : 4,226,306
DATED : October 7, 1980
INVENTOR(S) : Arnold Schafer

It is certified that error appears in the above—identified patent and that said Letters Patent is hereby corrected as shown below:

Column 4, line 28, delete "1" after "33a".

Column 5, line 40, change "switches" to --switched--.

Signed and Sealed this

Third Day of March 1981

[SEAL]

Attest:

RENE D. TEGTMEYER

Attesting Officer  Acting Commissioner of Patents and Trademarks